April 8, 1947.   B. MULLER   2,418,595
DISTANCE CALIPER
Filed March 21, 1945
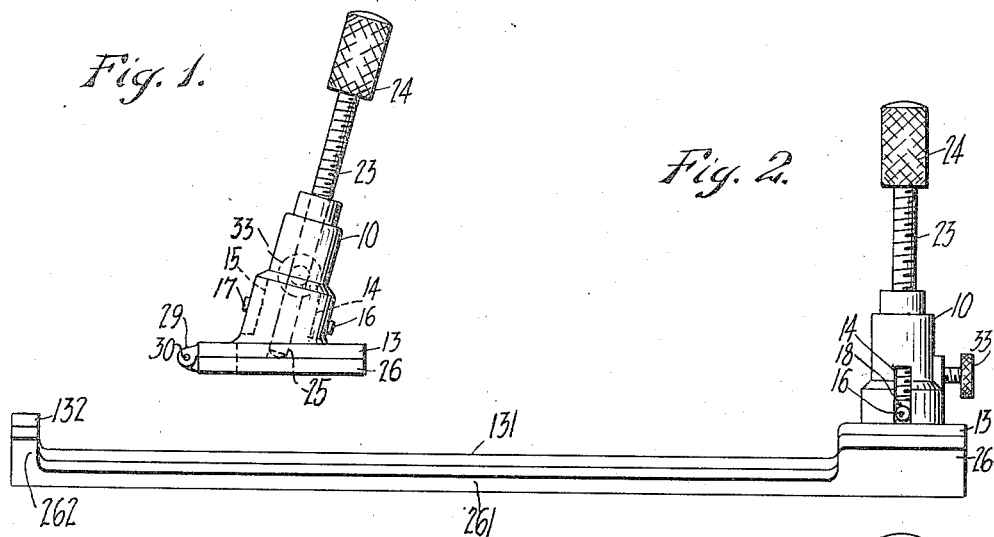
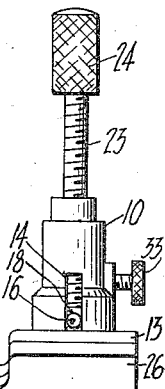
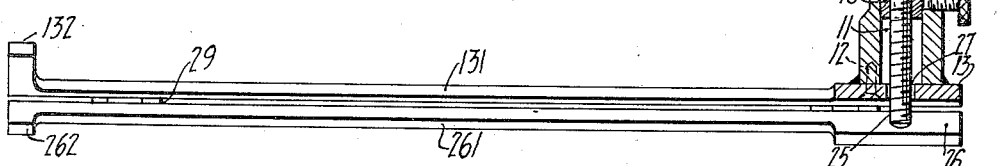
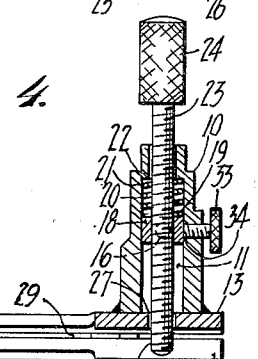
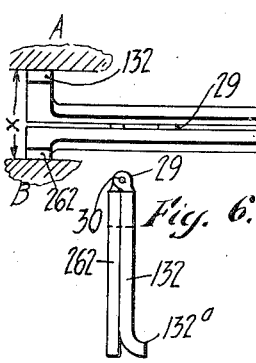
INVENTOR.
BELA MULLER,
BY
M. P. Parish
ATTORNEY.

Patented Apr. 8, 1947

2,418,595

UNITED STATES PATENT OFFICE 2,418,595

DISTANCE CALIPER

Bela Muller, New York, N. Y.

Application March 21, 1945, Serial No. 583,978

2 Claims. (Cl. 33—154)

This invention relates to measuring devices of the type which measure distances with extreme accuracy particularly distances which are not easily accessible to the present measuring devices.

An object is to provide a measuring device which has hinged together elongated plates having left and right ends, the left ends having means for contact with measurable portions of objects inaccessible to present known measuring devices, the right ends indicating the distance so contacted by the left ends which indicated distance at the right end, may be separately measured with ordinary well known measuring devices such as micrometers.

Another object is to provide a measuring device having means at the right end thereof to visibly indicate when the left end measuring contact points are in contact with the object to be measured, and means for locking the visible means in fixed positions.

Other objects and advantages of the invention will become apparent as the specification proceeds reference being made to the accompanying drawing in which:

Fig. 1 is a side elevation view of my novel device.

Fig. 2 is a front elevation view of my device having the hinged plates in closed positions.

Fig. 3 is a front elevation view of my device partly in section and showing its hinged plates in open position.

Fig. 4 is a front elevation view of my device partly in section and showing the hinged plates in open position, and also showing the inner piston in locked position.

Fig. 5 is a fragmentary plan view of the left end of my plates and showing a turned up end lip.

Fig. 6 is a side view of the device of Fig. 5.

A cylinder block 10, having cylinder 11 is suitably fastened with, for example screws 12 to right end of upper plate 13. A front slot 14 and rear slot 15 provide sliding passageway for respective front and rear arms 16, 17 suitably mounted on piston 18. The arms 16, 17 are also maintained non turnable in said slots, and it is thus seen that piston 18 is also non turnable in the cylinder. The cylindrical or other shaped piston 18 has one end 19 of coil spring 20 bearing against it. The other end 21 of the spring bears against shoulder 22 of cylinder block 10. The spring 20 normally tends to force the piston 18 downwardly.

Threads are provided in the central portion of the piston to cooperate with similar threads on stud 23. It is seen that the stud 23 is thus turnably mounted in the piston 18 and that actuated clockwise turn of the stud, preferably by means of knurled knob 24, advances the stud's lower end 25 downward to bear against lower plate 26. A bore 27 in upper plate 13 provides passageway for the lower part of the stud while bore 28 in the upper part of cylinder block 10 provides passageway for the upper part of the stud. The piston 18 with its stud 23 are thus slidable in the cylinder 11 against the action of said spring 20.

The plates 13, 26 are swingable about the hinge 29 or other pivotal means and are preferably permanently fastened together altho at times the pin 30 may be removable from the hinge to provide removable fastening of the plates.

I prefer to provide a spring 20 having compression force which is less than the force necessary to twist the plates so that the piston may move against the spring's action before the plates will bend.

I prefer the central parts of my plates 131, 261 to be narrower than the end portions 132, 262.

In operation in order to measure the distance X, Fig. 4, between objects A and B the ends 132, 262 (while in the position of Figs. 1 and 2) are placed between the said objects and knob 24 is turned so that stud end 25 is moved to advance thru the stationary piston 18 to bear against plate 26 to thus space the plate 26 away from plate 13 sufficient to make ends 132, 262 contact objects A and B. At the instant of said contact the piston arm 16 is seen to begin moving upward in slot 14 which movement indicates to the operator that said contact has been made. The piston may then be locked in position, relative to the cylinder, by clockwise turn of lock stud 33 so that stud end 34 bears against the piston. The spread of elements 132, 262 which I prefer to conform with similar spread of the other end of the plates 13, 26 may then be related.

The respective spreads may also be proportionally measured at either the left or right end of the plates. The respective spreads may also be proportionally related. It is seen that when the piston is thus so locked, stud 23 may not be turned in clockwise direction.

It is seen that when piston 18 is not locked as above described and while elements 132, 262 contact A and B continued turn of stud 23 merely moves the piston arms 16, 17 further upwards in slots 15, 16 to be thus locked at a higher place than first above described. Said continued movement of stud 23 does not, however, change the spread contact position of elements 132, 262.

At times I prefer one or both of the tip ends 132a of elements 132, 262 to be bent upwards as in Fig. 6.

The disclosure is intended to be illustrative and not limiting.

I claim:

1. A measuring device of the class described comprising a lower and an upper elongated plate each having front and back edges and being hinged together at their back edges, a tubular cylinder mounted on the upper plate and having a bore, a piston slideable in the bore and having side arms, slots in the side of the cylinder for slideable mount of the piston arms therein whereby the piston is held against rotation in the cylinder, a spring having one end against the cylinder and another end against the piston and normally forcing the piston downwards, a stud threaded through the piston and having upper and lower ends, a bore in the upper plate for passage of the lower end of the stud therethru for contact of the stud's lower end with the lower plate, whereby turn of the stud in one direction moves the contacted lower plate arcuately away from the upper plate.

2. A measuring device of the class described comprising a lower and an upper elongated plate having left and right ends and back and front edges and being hinged together at the back edges, a tubular cylinder mounted on the upper plate and having an inner shoulder in the tube and a bore extending downward from the shoulder, a piston slideable in the bore and having side arms, slots in the side of the cylinder for slideable mount of the piston arms therein whereby the piston is held against rotation in the cylinder, a spring having one end against the shoulder and another end against the piston and normally forcing the piston downwards, a stud threaded thru the piston and having upper and lower ends, the upper end having a knob and extending upwards out of the cylinder, a bore in the upper plate for passage therethru of the lower end of the stud to contact the lower plate when the stud is turnably moved downwards to move the lower plate arcuately away from the upper plate, means to lock the piston in a selected position relative to the cylinder comprising a stud in the cylinder wall engageable with the piston.

BELA MULLER.

REFERENCES CITED

The following references are of record in the file of this patent:

UNITED STATES PATENTS

| Number | Name | Date |
|--------|------|------|
| 21,809 | Barney | Oct. 19, 1858 |